United States Patent
Bagri et al.

(10) Patent No.: US 11,461,205 B1
(45) Date of Patent: Oct. 4, 2022

(54) ERROR MANAGEMENT SYSTEM FOR SYSTEM-ON-CHIP

(71) Applicant: NXP B.V., Eindhoven (NL)

(72) Inventors: Neha Bagri, Greater Noida (IN); Abhinav Gaur, Agra (IN); Nipun Mahajan, New Delhi (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/445,730

(22) Filed: Aug. 24, 2021

(51) Int. Cl.
G06F 11/22 (2006.01)
(52) U.S. Cl.
CPC ...... G06F 11/2236 (2013.01); G06F 11/2273 (2013.01)
(58) Field of Classification Search
CPC .................... G06F 11/2236; G06F 11/2273
USPC .......................................................... 714/41
See application file for complete search history.

(56) References Cited

U.S. PATENT DOCUMENTS

| | | | |
|---|---|---|---|
| 8,181,100 B1 | 5/2012 | Purdham et al. | |
| 8,572,529 B2 | 10/2013 | Zawalski et al. | |
| 8,621,281 B2 * | 12/2013 | Kan | G06F 9/3865 |
| | | | 714/25 |
| 10,248,521 B2 | 4/2019 | Catherwood et al. | |
| 10,625,752 B2 | 4/2020 | Kakoee et al. | |

OTHER PUBLICATIONS

"TEF810X—76 GHz to 81 GHz car RADAR transceiver Rev. 1.0—May 10, 2019", NXP, 13 pgs., retrieved from the internet Aug. 23, 2021 at: https://www.nxp.com/docs/en/data-sheet/TEF810XDS.pdf (May 10, 2019).
"TEF810X 77GHz Automotive Radar Transceiver", NXP, 2 pgs., retrieved from the internet Aug. 23, 2021 at: https://www.nxp.com/docs/en/fact-sheet/TEF810XFS.pdf (Aug. 1, 2019).

* cited by examiner

Primary Examiner — Joseph R Kudirka (57) ABSTRACT

An error management system can include register sets associated with an error reaction. The test errors are injected in functional signals based on activation of multiple bits in one of the register sets. When the functional signals with the injected test errors are received by the error management system, multiple bits in the other register set are activated. The error management system generates an activated indication signal when a number of the activated bits in one register set matches a number of activated bits in the other register set. When the indication signal is activated, the error management system generates a reaction signal indicative of the error reaction. Thus, the error management system generates a single reaction signal in response to the injected test errors requiring the same reaction.

20 Claims, 2 Drawing Sheets

ERROR MANAGEMENT SYSTEM FOR SYSTEM-ON-CHIP

BACKGROUND

The present disclosure relates generally to electronic circuits, and, more particularly, to an error management system.

In a system-on-chip (SoC), various functional circuits (e.g., memories, math accelerators, digital signal processors, or the like) output functional signals to execute various operations associated therewith. Such functional signals may include functional errors that disrupt functional operations of the SoC. To manage such functional errors, the SoC includes an error management system. When the error management system detects a functional error in the functional signal, a corresponding reaction (e.g., one of reset, interrupt, or the like) is instantly executed by the error management system.

The error management system may further detect an intentional test error that is injected into a functional signal to test the SoC. A conventional error management system instantly executes a reaction for both an injected test error and another reaction for a functional error. As the detection of each test error is followed by an instant reaction, the number of processing cycles of the SoC required to execute the reaction is same for the injected test error and the functional error. Further, the functional circuits remain unavailable to execute functional operations during the execution of the reactions, thereby reducing the overall availability of the SoC to execute the functional operations. Therefore, there exists a need for a technical solution that solves the aforementioned problems of conventional error management systems.

SUMMARY

In an embodiment of the present disclosure, an error management system is disclosed. The error management system can include a sampling circuit, an error tracking circuit, and a reaction circuit. The sampling circuit can be configured to receive a plurality of error signals that are generated when a plurality of test errors are injected in a plurality of functional signals. The error tracking circuit can comprise first and second register sets associated with a first error reaction. Further, the plurality of test errors can be injected in the plurality of functional signals based on activation of a first plurality of bits in the first register set. A second plurality of bits in the second register set are activated based on the reception of the plurality of error signals by the sampling circuit. Further, the error tracking circuit can be configured to generate an indication signal such that the indication signal is activated when a first number of the activated first plurality of bits matches a second number of the activated second plurality of bits. The reaction circuit can be coupled with the error tracking circuit and configured to receive the indication signal and generate a reaction signal indicative of the first error reaction when the indication signal is activated.

In another embodiment of the present disclosure, an error management system is disclosed. The error management system can include a sampling circuit, an error tracking circuit, and a reaction circuit. The sampling circuit can be configured to receive first and second sets of error signals and a plurality of injection signals and output, based on the plurality of injection signals, at least one of a set of activation signals and a set of functional error signals. The first and second sets of error signals can be generated based on first and second sets of functional signals. The error tracking circuit can comprise first and second register sets associated with a first error reaction. Further, the error tracking circuit can be configured to receive the set of activation signals when the first set of error signals is generated based on a set of test errors, and generate an indication signal. The set of test errors can be injected in the first set of functional signals, based on activation of a first set of bits in the first register set. The sampling circuit can be further configured to activate in the second register set, a second set of bits by way of the set of activation signals. The error tracking circuit can be further configured to activate the indication signal when a first number of the activated first set of bits matches a second number of the activated second set of bits. The reaction circuit can be configured to at least one of receive the indication signal from the error tracking circuit and a first reaction signal when the indication signal is activated. The reaction circuit can be further configured to receive the set of functional error signals from the sampling circuit when the second set of error signals is generated based on presence of a set of functional errors in the second set of functional signals. The reaction circuit can be further configured to generate a corresponding reaction signal of a second set of reaction signals when a corresponding error signal of the set of functional error signals is received.

In yet another embodiment of the present disclosure, a system-on-chip (SoC) is disclosed. The SoC can include error detection circuitry and an error management system. The error detection circuitry can be configured to receive first and second sets of functional signals and generate first and second sets of error signals and first and second sets of injection signals, respectively. The first set of error signals can be generated based on injection of a set of test errors in the first set of functional signals and the second set of error signals can be generated based on presence of a set of functional errors in the second set of functional signals. The error management system can include first and second register sets associated with a first error reaction. The error management system can be configured to receive the first and second sets of error signals. The error management system can be further configured to at least one of generate an indication signal when a first number of activated bits in the first register set matches a second number of activated bits in the second register set. The error management system can be further configured to generate a first reaction signal associated with the first error reaction when the indication signal is activated, and generate a corresponding reaction signal of a second set of reaction signals when a corresponding error signal of the second set of error signals is received.

In some embodiments, the error tracking circuit can be further configured to receive a first programming signal. The first plurality of bits can be activated by way of the first programming signal.

In some embodiments, the error tracking circuit can further comprise a processing circuit that is coupled with the reaction circuit and the first and second register sets. The processing circuit can be configured to generate first and second tracking signals and track an activation status of each of the first and second pluralities of bits by way of the first and second tracking signals, respectively.

In some embodiments, the error tracking circuit can further comprise a third register set. The third register set can be configured to receive a second programming signal. Further, a third bit in the third register set can be activated by way of the second programming signal. The third bit can be associated with the first error reaction. Further, the plurality of test errors can be injected when the first plurality of bits in the first register set and the third bit are activated in the third register set.

In some embodiments, the processing circuit can be further configured to generate the indication signal. Further, the processing circuit can deactivate the indication signal when the first number of the activated first plurality of bits does not match the second number of the activated second plurality of bits.

In some embodiments, the sampling circuit can be further configured to output a plurality of activation signals when the plurality of error signals are received by the sampling circuit. Further, the sampling circuit can activate the second plurality of bits in the second register set by way of the plurality of activation signals.

In some embodiments, the sampling circuit can be further configured to receive a plurality of injection signals that indicate injection of the plurality of test errors in the plurality of functional signals. Further, each injection signal of the plurality of injection signals can be associated with a corresponding error signal of the plurality of error signals. The plurality of activation signals can be outputted based on the indication by the plurality of injection signals.

In some embodiments, when a first set of injection signals of the plurality of injection signals indicate that the first set of error signals can be generated based on the injection of the set of test errors in the first set of functional signals, the sampling circuit outputs the set of activation signals. Further, when a second set of injection signals of the plurality of injection signals indicate that the second set of error signals can be generated based on the presence of the set of functional errors in the second set of functional signals, the sampling circuit outputs the set of functional error signals.

In some embodiments, the SoC can further include injection circuitry. The injection circuitry can be configured to receive a first programming signal and inject the set of test errors in the first set of functional signals.

In some embodiments, the SoC can further include a core circuit. The core circuit can be configured to output the first programming signal and second and third programming signals and provide the first through third programming signals to the injection circuitry, the first register set, and the third register set, respectively. Further, the first number of bits in the first register set and the bit in the third register set can be activated when the second and third programming signals are provided to the first and third register sets, respectively.

Various embodiments of the present disclosure disclose an error management system that is configured to output a reaction signal in response to multiple test errors such that the reaction signal is indicative of a common error reaction associated with each of the test errors. The error management system further outputs another set of reaction signals in response to multiple functional errors. The error management system can include a sampling circuit, an error tracking circuit, and a reaction circuit. The sampling circuit can be configured to receive multiple error signals that are generated when multiple test errors are injected in multiple functional signals such that each test error is injected in a corresponding functional signal. The sampling circuit can be further configured to output multiple activation signals when the error signals are received by the sampling circuit. The error tracking circuit can include two register sets associated with the error reaction. Further, the test errors can be injected based on activation of a first plurality of bits in one register set whereas a second plurality of bits in the other register set are activated by way of the activation signals. The error tracking circuit further generates an indication signal such that the indication signal is activated when a number of the activated first plurality of bits matches a number of the activated second plurality of bits. The reaction circuit receives the indication signal and generates the reaction signal indicative of the error reaction when the indication signal is activated.

The error management system of the present disclosure differentiates the injected test errors from the functional errors. In addition, the error management system generates a single reaction in response to multiple test errors associated with the same error reaction. Thus, the number of processing cycles of the SoC is reduced since a single reaction signal is generated by grouping errors associated with the same reaction as compared to generating a reaction signal each time a functional signal injected with a test error is received by conventional error management systems. A reduction in the number of processing cycles leads to an increase in the availability of the functional circuits to execute functional operations.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
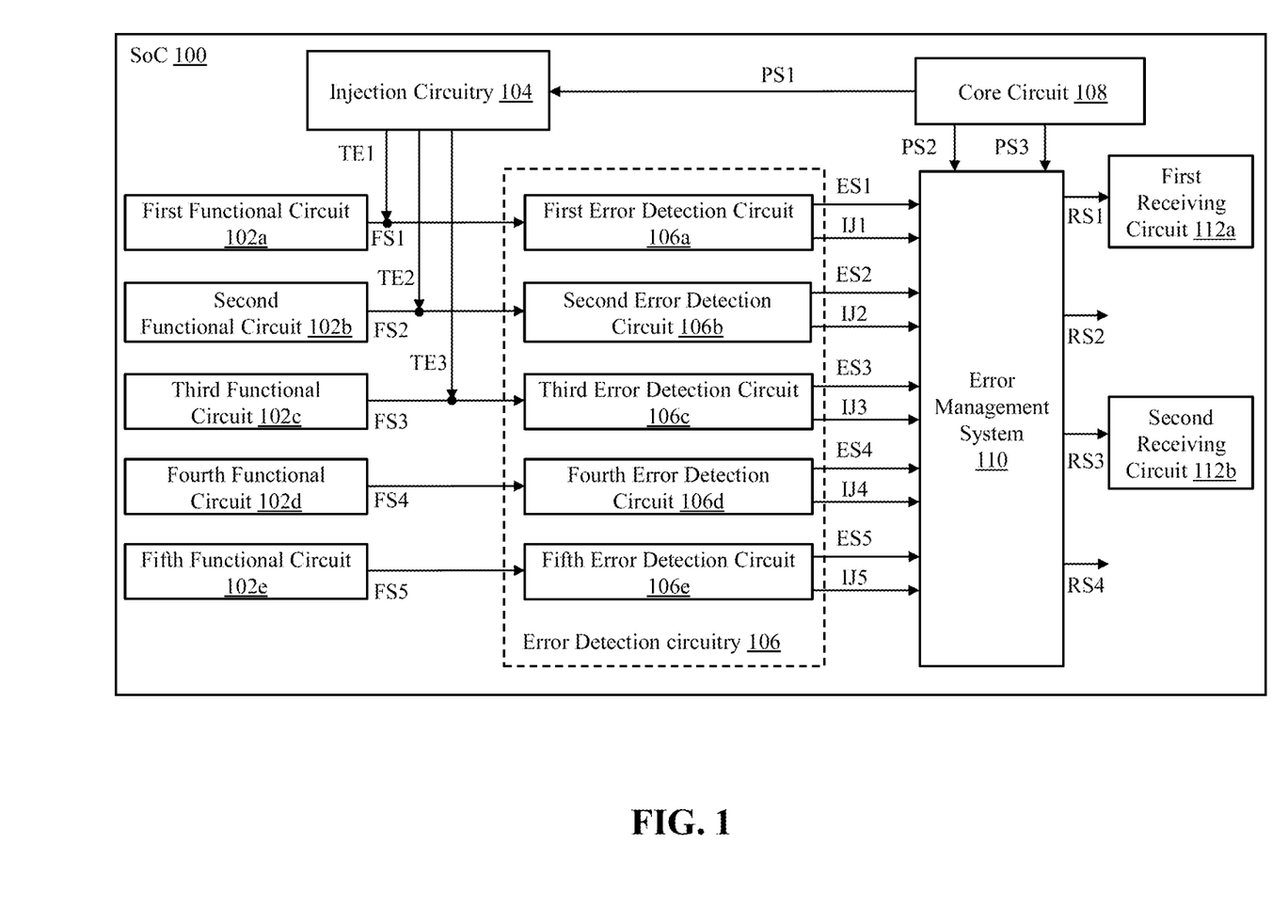
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 can include a plurality of functional circuits of which first through fifth functional circuits 102a-102e are shown. Examples of the plurality of functional circuits can include but are not limited to, a memory, a math accelerator, a motor controller, or the like. The SoC 100 can further include injection circuitry 104 and an error detection circuitry 106. The error detection circuitry 106 includes first through fifth error detection circuits 106a-106e. The SoC 100 can further include a core circuit 108, an error management system 110, and a plurality of receiving circuits of which first and second receiving circuits 112a and 112b are shown. The SoC 100 may be utilized in a driver override system, a future battery management application, a mobile device, or the like.

The first through fifth functional circuits 102a-102e may include suitable circuitry that can be configured to perform one or more operations. The first through fifth functional circuits 102a-102e can be configured to output and provide first through fifth functional signals FS1-FS5, respectively, to various circuitries of the SoC 100. The various circuitries can further carry out operations, based on a reception of a corresponding functional signal of the first through fifth functional signals FS1-FS5. In an embodiment, the first through fifth functional signals FS1-FS5 are binary signals. It will be apparent to a person skilled in the art that the SoC 100 can include more than five functional circuits (i.e., more than the first through fifth functional circuits 102a-102e).

The injection circuitry 104 may include suitable circuitry that can be configured to perform one or more operations. For example, the injection circuitry 104 can be configured to receive a first programming signal PS1 and inject first through third test errors TE1-TE3 in the first through third functional signals FS1-FS3, respectively. In an example, injecting the first through third test errors TE1-TE3 in the first through third functional signals FS1-FS3 reverses a corresponding bit of a set of bits in each of the first through third functional signals FS1-FS3, respectively. The first programming signal PSI may be a single-bit or multi-bit signal. In an embodiment, the injection circuitry 104 can include a plurality of injection circuits (not shown) such that each injection circuit can inject a corresponding test error, i.e., one of the first through third test errors TE1-TE3. Although it is described that a single test error is injected in each of the first through third functional signals FS1-FS3, the scope of the present disclosure is not limited to it. In an alternate embodiment, multiple test errors can be injected in each of the first through third functional signals FS1-FS3 by the injection circuitry 104 without deviating from the scope of the present disclosure.

As the first through third test errors TE1-TE3 are injected in the first through third functional signals FS1-FS3 to check an operation of the SoC 100, the first through third test errors TE1-TE3 may not require an instant reaction to be implemented in the SoC 100, respectively. Further, the injection of the first through third test errors TE1-TE3 in the first through third functional signals FS1-FS3, respectively, may occur during a start-up of the SoC 100, a shut-down of the SoC 100, and periodically during an operation of the SoC 100. Therefore, the first through third test errors TE1-TE3 or different test errors may be injected in the first through third functional signals FS1-FS3 multiple times to occasionally test the SoC 100. The first and second test errors TE1 and TE2 are associated with the first error reaction, and the third test error TE3 is associated with a second error reaction.

The error detection circuitry 106 can be coupled with the first through fifth functional circuits 102a-102e. Further, the error detection circuitry 106 can be configured to receive the first through third functional signals FS1-FS3 injected with the first through third test errors TE1-TE3, respectively. The error detection circuitry 106 can be configured to receive fourth and fifth functional signals FS4 and FS5 with the presence of first and second functional errors, respectively. The first and second functional errors can be present in the fourth and fifth functional signals FS4 and FS5. In an example, the presence of the first and second functional errors in the fourth and fifth functional signals FS4 and FS5 may indicate an error in an operation of the fourth and fifth functional circuits 102d and 102e, respectively. In various other examples, the presence of the first and second functional errors in the fourth and fifth functional signals FS4 and FS5 may be due to reception of erroneous input signals (not shown) by the fourth and fifth functional circuits 102d and 102e thereby generating the first and second functional errors in each of the fourth and fifth functional signals FS4 and FS5, respectively. Examples of the error detection circuitry 106 can include but are not limited to, error correction code checker and parity checker.

The error detection circuitry 106 can be further configured to generate first through fifth error signals ES1-ES5 and first through fifth injection signals IJ1-IJ5. The first through fifth error signals ES1-ES5 and the first through fifth injection signals IJ1-IJ5 are generated based on the first through fifth functional signals FS1-FS5, respectively. The first through fifth injection signals IJ1-IJ5 correspond to the first through fifth error signals ES1-ES5, respectively. The first through fifth error signals ES1-ES5 are indicative of whether an error is present in the first through fifth functional signals FS1-FS5, respectively. Further, the first through fifth injection signals IJ1-IJ5 are indicative of whether the error indicated by the first through fifth error signals ES1-ES5, respectively, are test errors.

When an error is detected in a functional signal by the error detection circuitry 106, the corresponding error signal is activated. In an embodiment of the present disclosure, the corresponding error signal is generated at a logic high state. For example, when the first through third functional signals FS1-FS3 are injected with the first through third test errors TE1-TE3 and the fourth and fifth functional signals FS4 and FS5 have the first and second functional errors present in them, the first through fifth error signals ES1-ES5 are activated (i.e., are at a logic high state), respectively. In the presently preferred embodiment, the error detection circuitry 106 generates an injection signal associated with the corresponding error signal at a logic high state when the corresponding detected error is an injected error, and an injection signal associated with the error signal at a logic low state when the corresponding detected error is a functional error. In an example, as the first through third functional signals FS1-FS3 are injected with the first through third test errors TE1-TE3, the first through third injection signals U1-U3 are activated (i.e., are at a logic high state). In addition, as the first and second functional errors are present in the fourth and fifth functional signals FS4 and FS5, the fourth and fifth injection signals IJ4 and IJ5 are deactivated (i.e., generated at a logic low state).

The first and second functional errors can be associated with third and fourth error reactions, respectively. For example, when the first and second functional errors are detected by the error detection circuitry 106, third and fourth error reactions can be executed. The error reactions associated with the first and second functional errors may be the same or different as the error reactions associated with the first through third test errors TE1-TE3. In a presently preferred embodiment, the first through fifth functional signals FS1-FS5 are provided to the error detection circuitry 106, sequentially.

The error detection circuitry 106 can further include the first through fifth error detection circuits 106a-106e. The first through fifth error detection circuits 106a-106e can be coupled with the first through fifth functional circuits 102a-102e, respectively. Further, the first through third error detection circuits 106a-106c can be configured to receive the first through third functional signals FS1-FS3 injected with the first through third test errors TE1-TE3, respectively. Similarly, the fourth and fifth error detection circuits 106d and 106e can be configured to receive the fourth and fifth functional signals FS4 and FS5 with the presence of the first and second functional errors, respectively. Further, each of the first through fifth error detection circuits 106a-106e can be configured to detect at least one of a presence of a functional error or test error in the first through fifth functional signals FS1-FS5, respectively.

The first through third error detection circuits 106a-106c can be further configured to generate activated first through third error signals ES1-ES3 and activated first through third injection signals IJ1-IJ3 as the first through third functional signals FS1-FS3 are injected with the first through third test errors TE1-TE3, respectively. Further, the fourth and fifth error detection circuits 106d and 106e can be configured to generate activated fourth and fifth error signals ES4 and ES5 and deactivated fourth and fifth injection signals IJ4 and IJ5, as the first and second functional errors are present in the fourth and fifth functional signals FS4 and FS5, respectively. Further, the first through fifth error detection circuits 106a-106e can be configured to provide the first through fifth error signals ES1-ES5 and the first through fifth injection signals IJ1-IJ5 to the error management system 110. It will be apparent to a person skilled in the art, that when the SoC 100 includes more than five functional circuits (i.e., more than the first through fifth functional circuits 102a-102e), the error detection circuitry 106 may include more than five error detection circuits (i.e., more than the first through fifth error detection circuits 106a-106e). In another embodiment, the error detection circuitry 106 is a single error detection circuit that detects the first through third test errors TE1-TE3 and the first and second functional errors FS4 and FS5 in the first through fifth functional signals FS1-FS5, respectively. Further, the activated first through fifth error signals ES1-ES5, the activated first through third injection signals IJ1-IJ3, and the deactivated fourth and fifth injection signals IJ4 and IJ5 can be provided to the error management system 110.

The core circuit 108 can be coupled with the injection circuitry 104. The core circuit 108 includes suitable circuitry that can be configured to perform one or more operations. For example, the core circuit 108 can be configured to output and provide the first programming signal PS1 to the injection circuitry 104 and second and third programming signals PS2 and PS3 to the error management system 110. Although in the present embodiment, the second and third programming signals PS2 and PS3 are one-bit signals, it will be apparent to a person skilled in the art that the second and third programming signals PS2 and PS3 can be multi-bit signals. Further, the core circuit 108 can output the first programming signal PS1 after providing both the second and third programming signals PS2 and PS3 to the error management system 110. The core circuit 108 provides the second and third programming signals PS2 and PS3 to the error management system 110 to activate an error injection phase at the error management system 110 to test the SoC 100. The SoC 100 may be tested occasionally during its operation. Based on the second and third programming signals PS2 and PS3, the core circuit 108 outputs and provides the first programming signal PSI to the injection circuitry 104 to inject the first through third test errors TE1-TE3.

The error management system 110 can be coupled with the error detection circuitry 106 (i.e., the first through fifth error detection circuits 106a-106e). The error management system 110 can be configured to receive the first through fifth error signals ES1-ES5 and the first through fifth injection signals IJ1-IJ5. The first and second test errors TE1 and TE2 are associated with the first error reaction, and the third test error TE3 is associated with the second error reaction. In other words, when the first and second test errors TE1 and TE2 are detected by the error detection circuitry 106, a first reaction signal RS1 indicative of the first error reaction can be executed by the error management system 110. Similarly, when the third test error TE3 is detected by the error detection circuitry 106, a second reaction signal RS2 indicative of the second error reaction can be executed by the error management system 110. The first and second test errors TE1 and TE2 can be of the same type of error or different types of errors that require the same reaction. In an example, the first and second test errors TE1 and TE2 are parity errors that require the first error reaction. In another example, the first and second test errors TE1 and TE2 can be a parity error and a lockstep error, respectively, that require the first error reaction. Further, examples of the first and second error reactions can include but are not limited to, reset, interrupt, non-maskable interrupt, error out, or the like.

The error management system 110 can be further coupled with the core circuit 108. The error management system 110 can be configured to receive the second and third programming signals PS2 and PS3. The error management system 110 can be further configured to generate a plurality of reaction signals that include first through fourth reaction signals RS1-RS4, based on the first through fifth error signals ES1-ES5, the first through fifth injection signals IJ1-IJ5, and the second and third programming signals PS2 and PS3.

The core circuit 108, by way of the second programming signal PS2, can program the error management system 110 to indicate the injection of test errors (i.e., the first through third test errors TE1-TE3) in the functional signals (i.e., the first through third functional signals FS1-FS3). The third programming signal PS3 activates the initialization of the injection of test errors (i.e., the first through third test errors TE1-TE3) in the functional signals (i.e., the first through third functional signals FS1-FS3), based on the error reaction associated with the test errors (i.e., the first through third test errors TE1-TE3). In an embodiment, the second and third programming signals PS2 and PS3 initiate the activation of the error injection phase for outputting the first and second reaction signals RS1 and RS2.

The first programming signal PS1 can be generated by the core circuit 108, based on the second and third programming signals PS2 and PS3. The first programming signal PS1 can be generated such that, the first programming signal PS1 is indicative of the injection of the first through third test errors TE1-TE3 in the first through third functional signals FS1-FS3, respectively. Therefore, when the second and third programming signals PS2 and PS3 are received by the error management system 110 and the first programming signal PS1 is generated by the core circuit 108, the error injection phase is activated. Although in the presently preferred embodiment, the error injection phase is activated by way of the second and third programming signals PS2 and PS3, it will be apparent to a person skilled in the art that the scope of the present disclosure is not limited to it. In various other embodiments, the error injection phase can be activated by way of the first programming signal PS1.

When the error injection phase is activated, the error management system 110 receives the activated first through third error signals ES1-ES3, sequentially. In another embodiment, the second and third error signals ES2 and ES3 may be received before the first error signal ES1. The error management system 110 determines by way of the second and third programming signals PS2 and PS3, a number of error signals associated with a corresponding error reaction. Thus, the error management system 110 waits until all the error reactions associated with the corresponding error reaction are received. When all the error signals associated with the corresponding error reaction are received, the error management system 110 can generate a corresponding reaction signal in response to all the error signals associated with the error reaction. For example, the first and second test errors TE1 and TE2 are associated with the first error reaction. When the error management system 110 receives the activated first error signal ES1 indicating the detection of the first test error TE1, the error management system 110 stores the first test error TE1 by way of activating a bit in a corresponding register set of a second plurality of registers 208b as explained in detail in FIG. 2. Further, the error management system 110 waits until the error management system 110 receives the activated second error signal ES2 indicating the detection of the second test error TE2. On reception of the activated second error signal ES2, the error management system 110 generates the first reaction signal RS1 that is indicative of the first error reaction in response to both the first and second test errors TE1 and TE2. In another example, a single test error such as the third test error TE3 is associated with a single error reaction such as the second error reaction. When the error management system 110 receives the activated third error signal ES3 that indicates the detection of the third test error TE3, the second reaction signal RS2 indicative of the second error reaction is generated by the error management system 110. It will be understood by a person skilled in the art that when additional bits are activated by the second programming signal PS2 in the first plurality of registers 208a and the error management system 110 receives additional error signals corresponding to additional functional signals, the error management system 110 determines whether each of the error signals requires at least one of the first or second reactions. Based on the determination, the error management system 110 waits until all the error signals corresponding to the same reaction are received to generate a common reaction signal in response to all test errors requiring the same reaction.

When the error management system 110 receives an activated error signal and a deactivated injection signal, the error management system 110 generates an instant reaction signal in response to the detected functional error. Thus, when the error management system 110 receives the activated fourth and fifth error signals ES4 and ES5 and the deactivated fourth and fifth injection signals IJ4 and IJ5 to indicate detection of the first and second functional errors, the error management system 110 generates the third and fourth reaction signals RS3 and RS4, instantly. For example, when the error management system 110 receives the activated fourth error signal ES4 indicating the detection of the first functional error, the error management system 110 generates the third reaction signal RS3 indicative of the third error reaction, instantly. Similarly, when the error management system 110 receives the activated fifth error signal ES5 indicating the detection of the second functional error, the error management system 110 generates the fourth reaction signal RS4 indicative of the fourth error reaction, instantly.

In one scenario, when the error injection phase is activated and the error management system 110 receives a sixth error signal (not shown) that is deactivated and a sixth injection signal (not shown) that is activated, the error management system 110 determines whether activated bits corresponding to the sixth error signal are present in the error management system 110. If the corresponding bits are activated, the error management system 110 determines that the sixth error signal is erroneously deactivated by the error detection circuitry 106. In such a scenario, the error management system 110 processes the sixth error signal similar to the first through third error signals ES1-ES3.

In another scenario, when the error management system 110 receives a seventh error signal (not shown) that is deactivated and a seventh injection signal (not shown) that is activated and the error management system 110 determines that bits corresponding to the seventh error signal are not activated, the error management system 110 further determines that the seventh injection signal is corrupted. As a result, the error management system 110 determines that the seventh error signal indicates that no error is detected in a corresponding functional signal. Similarly, the error management system 110 can determine if any error signals (i.e., the first through fifth error signals ES1-ES5) and any injection signals (i.e., the first through fifth injection signals IJ1-IJ5) are corrupted.

In yet another scenario, when a functional error is not present or the injection circuitry 104 does not inject a test error in a corresponding functional signal, the error detection circuitry 106 does not generate an activated error signal and an activated injection signal and passes the received functional signal as it is to the error management system 110. The error management system 110 further passes the received functional signal as it is to the corresponding device without generating any reaction signal.

In yet another scenario, when the error management system 110 receives an eighth error signal that has both a functional error and an injected test error, the error management system 110 generates a corresponding reaction signal in response to the functional error in a manner similar to generating the third reaction signal RS3 in response to the first functional error. The error management system 110 further generates another reaction signal in response to the injected test error in a manner similar to the generation of the first error signal ES1 in response to the first test error TE1.

The error management system 110 can be further configured to provide the first and third reaction signals RS1 and RS3 to the first and second receiving circuits 112a and 112b. Further, the second and fourth reaction signals RS2 and RS4 can be provided to the third and fifth functional circuits 102c and 102e. The first and second receiving circuits 112a and 112b can be coupled with the error management system 110. The first and second receiving circuits 112a and 112b can include suitable circuitry that can be configured to perform one or more operations. For example, on the reception of the first through fourth reaction signals RS1-RS4, the first and second receiving circuits 112a and 112b can be configured to execute first and third reaction operations, respectively. Examples of the reaction operations include, but are not limited to reset, an interrupt, or a non-maskable interrupt of the SoC 100. When a reaction signal of the first and second reaction signals RS1 and RS2 is associated with a reset reaction, the corresponding receiving circuit can correspond to a reset controller. Therefore, based on an error reaction, the first and second receiving circuits 112a and 112b can correspond to different components. Further, it will be apparent to a person skilled in the art that when the error management system 110 generates more than four reaction signals (i.e., more than the first through fourth reaction signals RS1-RS4), the SoC 100 may include more than two receiving circuits (i.e., more than the first and second receiving circuits 112a and 112b).

Figure 2:
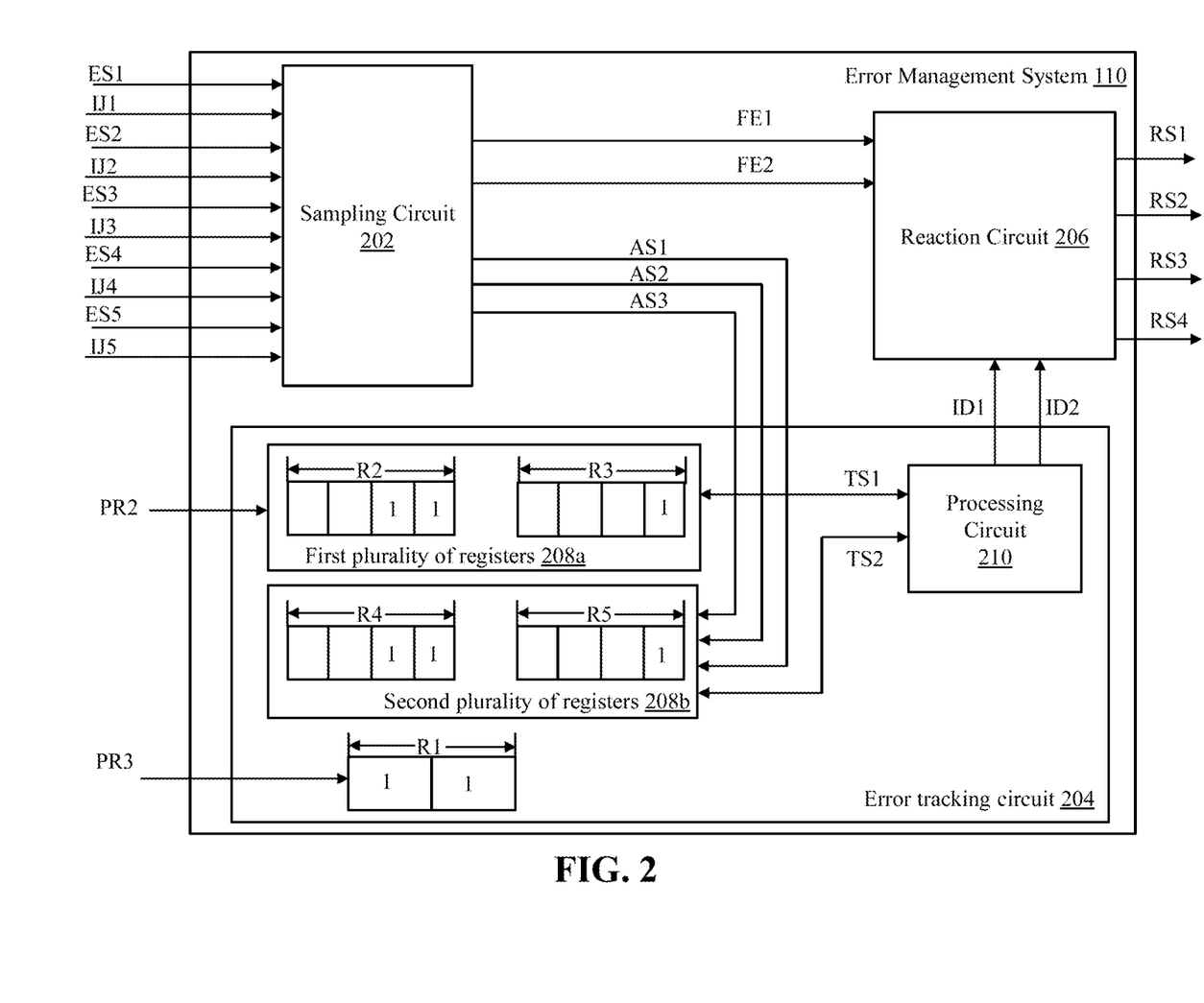
FIG. 2 illustrates a schematic block diagram of an error management system of the SoC in FIG. 1 in accordance with an embodiment of the present disclosure.

FIG. 2 illustrates a schematic block diagram of the error management system 110 of the SoC 100 of FIG. 1, in accordance with an embodiment of the present disclosure. The error management system 110 can include a sampling circuit 202, an error tracking circuit 204, and a reaction circuit 206.

The sampling circuit 202 can be coupled with the error detection circuitry 106 (i.e., the first through fifth error detection circuits 106a-106e). The sampling circuit 202 can be further configured to receive the first through fifth error signals ES1-ES5 and the first through fifth injection signals IJ1-IJ5 from the first through fifth error detection circuits 106a-106e, respectively. The sampling circuit 202 may include suitable circuitry that can be configured to perform one or more operations. For example, the sampling circuit 202 can be configured to output first through third activation signals AS1-AS3 and first and second functional error signals FE1 and FE2, based on the first through fifth injection signals IJ1-IJ5, respectively. Further, the sampling circuit 202 can be configured to provide the first through third activation signals AS1-AS3 to the error tracking circuit 204. Moreover, the sampling circuit 202 can be configured to provide the first and second functional error signals FE1 and FE2 to the reaction circuit 206.

The sampling circuit 202 receives the activated first through third error signals ES1-ES3 and the activated first through third injection signals IJ1-IJ3, indicating detection of the first through third test errors TE1-TE3 in the first through third functional signals FS1-FS3, respectively. Therefore, based on the reception of the activated first through third error signals ES1-ES3 and the activated first through third injection signals IJ1-IJ3, the sampling circuit 202 can output the first through third activation signals AS1-AS3, respectively. In the presently preferred embodiment, as the first through third error signals ES1-ES3 are received sequentially, the first through third activation signals AS1-AS3 are outputted sequentially.

Similarly, the sampling circuit 202 can receive the activated fourth and fifth error signals ES4 and ES5 and the deactivated fourth and fifth injection signals IJ4 and IJ5, indicating detection of the first and second functional errors in the fourth and fifth functional signals FS4 and FS5, respectively. Thus, based on the reception of the activated fourth and fifth error signals ES4 and ES5 and the deactivated fourth and fifth injection signals IJ4 and IJ5, the sampling circuit 202 can output the first and second functional error signals FE1 and FE2, respectively. The first and second functional error signals FE1 and FE2 are indicative of the first and second functional errors, respectively. Further, the first and second functional error signals FE1 and FE2 are also indicative of the error reactions associated with the first and second functional errors (i.e., the third and fourth error reactions). Thus, the sampling circuit 202 outputs an activation signal when a corresponding injection signal indicates a test error, and a functional error signal when a corresponding injection signal indicates a functional error.

The error tracking circuit 204 can be coupled with the sampling circuit 202. Further, the error tracking circuit 204 can be configured to receive the first through third activation signals AS1-AS3 from the sampling circuit 202. The error tracking circuit 204 can be further coupled with the core circuit 108. The error tracking circuit 204 is further configured to receive the second and third programming signals PS2 and PS3 and generate first and second indication signals ID1 and ID2. The first indication signal ID1 is generated based on the reception of the first and second activation signals AS1 and AS2, and the second indication signal ID2 is generated based on the reception of the third activation signal AS3. Therefore, the error tracking circuit 204 generates an activated first indication signal ID1 when the first and second activation signals AS1 and AS2 are received by the error tracking circuit 204. Similarly, the error tracking circuit 204 generates an activated second indication signal ID2 when the third activation signal AS3 is received by the error tracking circuit 204. Moreover, the error tracking circuit 204 can be coupled with the reaction circuit 206. The error tracking circuit 204 can be configured to provide the first and second indication signals ID1 and ID2 to the reaction circuit 206.

The error tracking circuit 204 can include first and second pluralities of registers 208a and 208b, a first register set R1, and a processing circuit 210. The first plurality of registers 208a can be coupled with the core circuit 108 and the processing circuit 210. The first plurality of registers 208a are configured to receive the second programming signal PS2 from the core circuit 108 and a first tracking signal TS1 from the processing circuit 210. Based on the type of error reactions, the first plurality of registers 208a can include second and third register sets R2 and R3. In the presently preferred embodiment, the second register set R2 can be associated with the first error reaction, and the third register set R3 can be associated with the second error reaction. Thus, each register set of the first plurality of registers 208a can be associated with a different error reaction.

The second and third register sets R2 and R3 of the first plurality of registers 208a can include first and second pluralities of bits, respectively. The first and second pluralities of bits can be based on a number of error signals supported by the error management system 110. In an example, the first and second pluralities of bits correspond to four bits, however, it will be apparent to a person skilled in the art that the scope of the present disclosure is not limited to it. In various other embodiments, the first and second pluralities of bits can correspond to more than four bits.

Based on the reception of the second programming signal PS2, first and second bits of the second register set R2 and a third bit of the third register set R3 can be activated to indicate the injection of test errors (i.e., the first through third test errors TE1-TE3) in the functional signals (i.e., the first through third functional signals FS1-FS3). The core circuit 108 can determine a number of test errors that need to be injected to test the SoC 100. The core circuit 108 further determines a type of reaction associated with each error. Based on the determination of the number of test errors and the type of reaction, the core circuit 108 indicates by way of the second programming signal PS2, a number of bits that need to be activated in each of the second and third register sets R2 and R3 of the first plurality of registers 208a. In an example, the second programming signal PS2 activates two bits associated with the same reaction such as the first and second bits of the second register set R2, and a single bit associated with another reaction such as the third bit of the third register set R3. As the first and second bits of the second register set R2 are activated and associated with the first error reaction, the first and second test errors TE1 and TE2 are associated with the first error reaction. Similarly, the third test error TE3 is associated with the second error reaction as the third bit of the third register set R3 is associated with the second error reaction. Further, the activated first through third bits in the first plurality of registers 208a can be tracked by the processing circuit 210, by way of the first tracking signal TS1.

The first through third test errors TE1-TE3 are injected in the first through third functional signals FS1-FS3, based on the activation of the first through third bits, respectively. In other words, the first programming signal PS1 is provided to the injection circuitry 104 based on the provision of the second programming signal PS2 by the core circuit 108 to the error management system 110. In another embodiment, the first and second programming signals PS1 and PS2 are simultaneously provided to the injection circuitry 104 and the error management system 110, respectively.

The second plurality of registers 208b can be coupled with the sampling circuit 202 and the processing circuit 210. The second plurality of registers 208b can be configured to receive the first through third activation signals AS1-AS3 from the sampling circuit 202 and a second tracking signal TS2 from the processing circuit 210. The second plurality of registers 208b can include fourth and fifth register sets R4 and R5. The second plurality of registers 208b can be grouped into the second plurality of register sets based on a type of error reaction. In the presently preferred embodiment, the fourth register set R4 can be associated with the first error reaction and the fifth register set R5 can be associated with the second error reaction. Each register set of the second plurality of registers 208b can be associated with a different error reaction. Further, the second plurality of registers 208b can be utilized to store the test errors (i.e., the first through third test errors TE1-TE3) by way of activating corresponding bits in the fourth and fifth register sets R4 and R5.

The fourth and fifth register sets R4 and R5 of the second plurality of registers 208b can include third and fourth pluralities of bits, respectively. The third and fourth pluralities of bits can be equal to the first and second pluralities of bits, respectively. In a presently preferred embodiment, the first and second pluralities of bits correspond to four bits, therefore the third and fourth pluralities of bits can correspond to four bits. However, it will be apparent to a person skilled in the art that the scope of the present disclosure is not limited to it.

Based on the reception of the first and second activation signals AS1 and AS2, fourth and fifth bits of the fourth register set R4 can be activated. Further, based on the reception of the third activation signal AS3, a sixth bit of the fifth register set R5 can be activated. In other words, the fourth and fifth bits of the fourth register set R4 and the sixth bit of the fifth register set R5 can be activated by way of the first through third activation signals AS1-AS3, respectively. Thus, the sampling circuit 202 by way of each activation signal of the first through third activation signals AS1-AS3, can be configured to activate a corresponding bit in the second plurality of registers 208b. Further, the second plurality of registers 208b can receive the first through third activation signals AS1-AS3, sequentially, therefore, the fourth through sixth bits are activated sequentially. However, it will be apparent to a person skilled in the art that an order of activation of the fourth through sixth bits is not limited to activating the fourth through sixth bits sequentially. In various other embodiments, the order of activation of the fourth through sixth bits may vary if any of the second and third activation signals AS2 and AS3 are received before the first activation signal AS1, without deviating from the scope of the present disclosure. Further, the activated fourth through sixth bits in the second plurality of registers 208b can be tracked by the processing circuit 210, by way of the second tracking signal TS2.

The first register set R1 can be coupled with the core circuit 108. The core circuit 108 can be configured to provide the third programming signal PS3 simultaneously with the second programming signal PS2 to the error management system 110. The core circuit 108 generates the third programming signal PS3 to activate a number of bits associated with the type of error reactions of the first through third test errors TE1-TE3. When both the second and third programming signals PS2 and PS3 are provided to the error management system 110, the core circuit 108 generates and provides the first programming signal PS1 to the injection circuitry 104 to inject the first through third test errors TE1-TE3. The first register set R1 can be configured to receive the third programming signal PS3. Further, the first register set R1 can include a fifth plurality of bits of which seventh and eighth bits are shown. Each bit of the first register set R1 can be associated with an error reaction. For example, the seventh bit of the first register set R1 can be associated with the first error reaction, and the eighth bit of the first register set R1 can be associated with the second error reaction. In the presently preferred embodiment, the first register set R1 includes two bits (i.e., the seventh and eighth bits) associated with the first and second error reactions, respectively. However, it will be apparent to a person skilled in the art that the scope of the present disclosure is not limited to it, and in various other embodiments, the first register set R1 can include more than two bits, each associated with a different error reaction, without deviating from the scope of the present disclosure.

Based on the reception of the third programming signal PS3, the seventh and eighth bits of the first register set R1 can be activated. In other words, the seventh and eighth bits of the first register set R1 are activated by way of the third programming signal PS3.

The first register set R1 can be utilized to initiate the injection of test errors associated with the corresponding error reaction. For example, when the seventh bit associated with the first error reaction is activated, based on the activated first and second bits of the second register set R2 that is associated with the first error reaction, the first and second test errors TE1 and TE2 can be injected in the first and second functional signals FS1 and FS2, respectively. In other words, the first and second test errors TE1 and TE2 can be injected when the first and second bits in the second register set R2 and the seventh bit in the first register set R1 are activated. Therefore, the error injection phase for the first error reaction is activated when both the first and second bits in the second register set R2 and the seventh bit in the first register set R1 are activated. Thus, the first programming signal PS1 is provided to the injection circuitry 104 when both the second and third programming signals PS2 and PS3 are provided to the error management system 110. Similarly, when the eighth bit associated with the second error reaction is activated, based on the activated third bit of the third register set R3 that is associated with the second error reaction, the third test error TE3 can be injected in the third functional signal FS3. Therefore, the error injection phase for the second error reaction is activated when the third bit in the third register set R3 and the eighth bit in the first register set R1 are activated.

Based on the injection of the first through third test errors TE1-TE3 in the first through third functional signals FS1-FS3, respectively, the first through third error signals ES1-ES3 are outputted by the error detection circuitry 106 (i.e., by the first through third error detection circuits 106a-106c), sequentially. Further, based on the reception of the first through third error signals ES1-ES3, the first through third activation signals AS1-AS3 are outputted and provided by the sampling circuit 202 to the second plurality of registers 208b, sequentially.

The processing circuit 210 can be coupled with the first and second pluralities of registers 208a and 208b. The processing circuit 210 may include suitable circuitry that can be configured to perform one or more operations. The processing circuit 210 can be configured to generate the first and second tracking signals TS1 and TS2 and track an activation status of each of the first through third bits by way of the first tracking signal TS1 and the fourth through sixth bits by way of the second tracking signal TS2. The processing circuit 210 can be further configured to generate first and second indications signals ID1 and ID2, sequentially. Further, the processing circuit 210 can be configured to provide the first and second indication signals ID1 and ID2 to the reaction circuit 206.

The processing circuit 210 generates an activated first indication signal ID1 when a number of the activated bits in the second register set R2 matches a number of the activated bits in the fourth register set R4. In the presently preferred embodiment, the processing circuit 210 generates the activated first indication signal ID1 when the fourth and fifth bits of the fourth register set R4 are activated. Further, the processing circuit 210 generates an activated second indication signal ID2 when a number of the activated bits in the third register set R3 matches a number of the activated bits in the fifth register set R5. In the presently preferred embodiment, the processing circuit 210 generates the activated second indication signal ID2 when the sixth bit of the fifth register set R5 is activated.

The processing circuit 210 generates a deactivated first indication signal ID1 when the number of the activated bits in the second register set R2 does not match the number of the activated bits in the fourth register set R4. In the presently preferred embodiment, the processing circuit 210 generates the deactivated first indication signal ID1 when any one of the fourth and fifth bits of the fourth register set R4 are deactivated. For example, when the second plurality of registers 208b receives the first activation signal AS1, the fourth bit of the fourth register set R4 is activated. The fifth bit is deactivated, as the second activation signal AS2 is not yet received by the second plurality of registers 208b. In such a scenario, the processing circuit 210 generates the deactivated first indication signal ID1 until the fifth bit is activated by the second activation signal AS2. Similarly, the processing circuit 210 generates a deactivated second indication signal ID2 when the number of the activated bits in the third register set R3 does not match the number of the activated bits in the fifth register set R5. In an example, the processing circuit 210 generates the deactivated second indication signal ID2 when the sixth bit of the fifth register set R5 is deactivated. In the presently preferred embodiment, the processing circuit 210 provides the first and second indication signals ID1 and ID2 to the reaction circuit 206, sequentially.

The reaction circuit 206 can be coupled with the processing circuit 210 and the sampling circuit 202. Further, the reaction circuit 206 can be configured to receive the first and second indication signals ID1 and ID2 from the processing circuit 210, and the first and second functional error signals FE1 and FE2 from the sampling circuit 202. The reaction circuit 206 may include suitable circuitry that can be configured to perform one or more operations. For example, the reaction circuit 206 can be further configured to generate the first through fourth reaction signals RS1-RS4. Further, the reaction circuit 206 can be configured to provide the first and third reaction signals RS1 and RS3 to the first and second receiving circuits 112a and 112b, respectively. On receiving the first through fourth reaction signals RS1-RS4, the first receiving circuit 112a, the third functional circuit 102c, the second receiving circuit 112b, and the fifth functional circuit 102e can be further configured to execute the corresponding error reactions, respectively.

The reaction circuit 206 can generate the first reaction signal RS1 in response to the first and second test errors TE1 and TE2. Therefore, the first reaction signal RS1 can be indicative of the first error reaction. Further, the reaction circuit 206 can generate the first reaction signal RS1 when the reaction circuit 206 receives the activated first indication signal ID1. Similarly, the reaction circuit 206 can generate the second reaction signal RS2 in response to the third test error TE3. Therefore, the second reaction signal RS2 can be indicative of the second error reaction. Further, the reaction circuit 206 can generate the second reaction signal RS2 when the reaction circuit 206 receives the activated second indication signal ID2. In the presently preferred embodiment, as the reaction circuit 206 receives the activated first and second indication signals ID1 and ID2, one after the other, therefore, the reaction circuit 206 can generate the first and second reaction signals RS1 and RS2 one after the other.

The reaction circuit 206 can generate the third reaction signal RS3 in response to the first functional error. Therefore, the third reaction signal RS3 can be indicative of the third error reaction. Further, the reaction circuit 206 can generate the third reaction signal RS3 when the reaction circuit 206 receives the first functional error signal FE1. Similarly, the reaction circuit 206 can generate the fourth reaction signal RS4 in response to the second functional error, i.e., when the reaction circuit 206 receives the second functional error signal FE2. Therefore, the fourth reaction signal RS4 can be indicative of the fourth error reaction. In the presently preferred embodiment, as the reaction circuit 206 receives the first and second functional error signals FE1 and FE2, one after the other, the reaction circuit 206 can generate the third and fourth reaction signals RS3 and RS4, one after the other. In an example, the first and second test errors TE1 and TE2 are parity errors, and the first error reaction is a reset reaction. Therefore, the first reaction signal RS1 is provided to the first receiving circuit 112a such that the first receiving circuit 112a resets on receiving the first reaction signal RS1. Similarly, the third test error TE3 is a lockstep error, and the second error reaction is an interrupt reaction, therefore, the second reaction signal RS2 can be provided to the third functional circuit 102c such that an operation of the third functional circuit 102c is interrupted on receiving the second reaction signal RS2. Further, the first and second functional errors can be lockstep and parity errors, respectively, and the third and fourth error reactions can be reset reactions. Therefore, the third and fourth reaction signals RS3 and RS4 are provided to the second receiving circuit 112b and various circuitries (not shown) of the SoC 100, to reset the second receiving circuit 112b and the SoC 100, respectively.

The error management system 110 of the present disclosure differentiates the first through third test errors TE1-TE3 and the first and second functional errors, by way of the error detection circuitry 106. Therefore, the error management system 110 is not limited to an error correction code (ECC) checker. Further, the error management system 110 generates the first reaction signal RS1 in response to both the first and second test errors TE1 and TE2 and waits to generate the first reaction signal RS1 until both the first and second error signals ES1 and ES2 are received. Thus, the error management system 110 generates a single reaction in response to multiple test errors that are associated with the same error reaction. Due to a single reaction in response to multiple test errors requiring the same reaction, a number of processing cycles of the SoC 100 reduces. Moreover, availability of the functional circuits (i.e., the first through fifth functional circuits 102a-102e) to execute functional operations increases as a single reaction is executed by grouping the same set of errors as compared to conventional error management systems that generate a reaction signal instantly on receiving each injected test error.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. An error management system comprising:
a sampling circuit configured to receive a plurality of error signals that are generated when a plurality of test errors are injected in a plurality of functional signals;
an error tracking circuit comprising first and second register sets associated with a first error reaction, wherein the plurality of test errors are injected in the plurality of functional signals based on activation of a first plurality of bits in the first register set, and a second plurality of bits in the second register set are activated based on the reception of the plurality of error signals by the sampling circuit, and wherein the error tracking circuit is configured to generate an indication signal such that the indication signal is activated when a first number of the activated first plurality of bits matches a second number of the activated second plurality of bits; and
a reaction circuit that is coupled with the error tracking circuit, and configured to receive the indication signal and generate a reaction signal indicative of the first error reaction when the indication signal is activated.

2. The error management system of claim 1, wherein the error tracking circuit is further configured to receive a first programming signal, and wherein the first plurality of bits are activated by way of the first programming signal.

3. The error management system of claim 2, wherein the error tracking circuit further comprises a processing circuit that is coupled with the reaction circuit and the first and second register sets, and wherein the processing circuit is further configured to generate first and second tracking signals and track an activation status of each of the first and second pluralities of bits by way of the first and second tracking signals, respectively.

4. The error management system of claim 3, wherein the error tracking circuit further comprises:
a third register set configured to receive a second programming signal, wherein a third bit in the third register set is activated by way of the second programming signal, wherein the third bit is associated with the first error reaction, and wherein the plurality of test errors are injected in the plurality of functional signals when the first plurality of bits in the first register set and the third bit in the third register set are activated.

5. The error management system of claim 4, wherein the processing circuit is further configured to generate the indication signal, and wherein the processing circuit deactivates the indication signal when the first number of the activated first plurality of bits does not match the second number of the activated second plurality of bits.

6. The error management system of claim 5, wherein the sampling circuit is further configured to output a plurality of activation signals when the plurality of error signals are received by the sampling circuit, and wherein the sampling circuit activates the second plurality of bits in the second register set by way of the plurality of activation signals.

7. The error management system of claim 6, wherein the sampling circuit is further configured to receive a plurality of injection signals that indicate injection of the plurality of test errors in the plurality of functional signals, wherein each injection signal of the plurality of injection signals is associated with a corresponding error signal of the plurality of error signals, and wherein the plurality of activation signals are outputted based on the indication by the plurality of injection signals.

8. An error management system comprising:
a sampling circuit configured to receive first and second sets of error signals and a plurality of injection signals and output, based on the plurality of injection signals, at least one of (i) a set of activation signals and (ii) a set of functional error signals, wherein the first and second sets of error signals are generated based on first and second sets of functional signals, respectively;
an error tracking circuit comprising first and second register sets associated with a first error reaction, wherein the error tracking circuit is configured to receive the set of activation signals when the first set of error signals is generated based on a set of test errors, and generate an indication signal, wherein the set of test errors is injected in the first set of functional signals, based on activation of a first set of bits in the first register set, wherein the sampling circuit is further configured to activate in the second register set, a second set of bits by way of the set of activation signals, and wherein the error tracking circuit is configured to activate the indication signal when a first number of the activated first set of bits matches a second number of the activated second set of bits; and
a reaction circuit configured to at least one of (i) receive the indication signal from the error tracking circuit and generate a first reaction signal when the indication signal is activated, and (ii) receive the set of functional error signals when the second set of error signals is generated based on presence of a set of functional errors in the second set of functional signals, and generate a corresponding reaction signal of a second set of reaction signals when a corresponding error signal of the set of functional error signals is received.

9. The error management system of claim 8, wherein when a first set of injection signals of the plurality of injection signals indicate that the first set of error signals is generated based on the injection of the set of test errors in the first set of functional signals, the sampling circuit outputs the set of activation signals, and when a second set of injection signals of the plurality of injection signals indicate that the second set of error signals is generated based on the presence of the set of functional errors in the second set of functional signals, the sampling circuit outputs the set of functional error signals.

10. The error management system of claim 8, wherein the error tracking circuit is further configured to receive a first programming signal, and wherein the first set of bits is activated by way of the first programming signal.

11. The error management system of claim 10, wherein the error tracking circuit further comprises a processing circuit that is coupled with the reaction circuit and the first and second register sets, and wherein the processing circuit is further configured to generate first and second tracking signals and track an activation status of each of the first and second sets of bits by way of the first and second tracking signals, respectively.

12. The error management system of claim 11, wherein the error tracking circuit further comprises: a third register set configured to receive a second programming signal, wherein a third bit in the third register set is activated by way of the second programming signal, wherein the third bit is associated with the first error reaction, and wherein the set of test errors is injected when the first set of bits and the third bit are activated.

13. The error management system of claim 12, wherein the processing circuit is further configured to generate the indication signal, and wherein the processing circuit deactivates the indication signal when the first number of the activated first set of bits does not match the second number of the activated second set of bits.

14. A system-on-chip (SoC) comprising:
error detection circuitry configured to receive first and second sets of functional signals and generate first and second sets of error signals and first and second sets of injection signals, respectively, wherein the first set of error signals is generated based on injection of a set of test errors in the first set of functional signals and the second set of error signals is generated based on presence of a set of functional errors in the second set of functional signals; and
an error management system comprising first and second register sets associated with a first error reaction, and configured to receive the first and second sets of error signals, wherein the error management system is further configured to at least one of (i) generate an indication signal when a first number of activated bits in the first register set matches a second number of activated bits in the second register set, and further generate a first reaction signal associated with the first error reaction when the indication signal is activated, and (ii) generate a corresponding reaction signal of a second set of reaction signals when a corresponding error signal of the second set of error signals is received.

15. The SoC of claim 14, wherein the error management system comprises:
a sampling circuit configured to receive the first and second sets of error signals and the first and second sets of injection signals and output at least one of (i) a set of activation signals and (ii) a set of functional error signals, based on the first and second sets of injection signals, wherein the first and second sets of error signals and the first and second sets of injection signals are generated based on the first and second sets of functional signals, respectively;
an error tracking circuit comprising the first and second register sets and a third register set, wherein the error tracking circuit is configured to receive the set of activation signals, wherein the set of test errors is injected in the first set of functional signals when the first number of bits in the first register set and a bit in the third register set that is associated with the first error reaction are activated, wherein the second number of bits in the second register set are activated when the set of activation signals is received, and wherein the error tracking circuit is further configured to generate the indication signal; and
a reaction circuit configured to at least one of (i) receive the indication signal and generate the first reaction signal, and (ii) receive the corresponding functional error signal of the set of functional error signals and generate the corresponding reaction signal of the second set of reaction signals.

16. The SoC of claim 15, wherein when the first set of injection signals indicate that the first set of error signals is generated based on the injection of the set of test errors in the first set of functional signals, the sampling circuit outputs the set of activation signals, and when the second set of injection signals indicate that the second set of error signals is generated based on the presence of the set of functional errors in the second set of functional signals, the sampling circuit outputs the set of functional error signals.

17. The SoC of claim 15, wherein the error tracking circuit further comprises: a processing circuit coupled with the reaction circuit and the first and second register sets, and configured to generate first and second tracking signals and track an activation status of each bit in the first register set by way of the first tracking signal, and each bit in the second register set by way of the second tracking signal.

18. The SoC of claim 17, wherein the processing circuit is further configured to generate the indication signal, and wherein the processing circuit deactivates the indication signal when the first number of the activated bits in the first register set does not match the second number of the activated bits in the second register set.

19. The SoC of claim 15, further comprising:
injection circuitry configured to receive a first programming signal and inject the set of test errors in the first set of functional signals.

20. The SoC of claim 19, further comprising:
a core circuit configured to output the first programming signal and second and third programming signals and provide the first through third programming signals to the injection circuitry, the first register set, and the third register set, respectively, wherein the first number of bits in the first register set and the bit in the third register set are activated when the second and third programming signals are provided to the first and third register sets, respectively.

* * * * *